(12) United States Patent
Rechtien et al.

(10) Patent No.: US 9,181,975 B2
(45) Date of Patent: Nov. 10, 2015

(54) METHOD FOR PRODUCING A SPHERICAL SLEEVE JOINT

(75) Inventors: Martin Rechtien, Neuenkirchen (DE); Volker Grube, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 229 days.

(21) Appl. No.: 13/822,653

(22) PCT Filed: Aug. 25, 2011

(86) PCT No.: PCT/EP2011/064589
§ 371 (c)(1),
(2), (4) Date: Mar. 13, 2013

(87) PCT Pub. No.: WO2012/038180
PCT Pub. Date: Mar. 29, 2012

(65) Prior Publication Data
US 2013/0177347 A1   Jul. 11, 2013

(30) Foreign Application Priority Data

Sep. 24, 2010   (DE) .......................... 10 2010 041 306

(51) Int. Cl.
*F16C 11/06*   (2006.01)
*F16C 43/02*   (2006.01)
*F16C 23/04*   (2006.01)

(52) U.S. Cl.
CPC ............. *F16C 11/0685* (2013.01); *F16C 11/06* (2013.01); *F16C 11/0614* (2013.01); *F16C 23/045* (2013.01); *F16C 43/02* (2013.01); *Y10T 403/32631* (2015.01)

(58) Field of Classification Search
CPC ........ B23P 15/003; F16C 43/00; F16C 43/02; F16C 43/08; F16C 43/06; Y10T 29/49636; Y10T 29/49643; Y10T 29/49696; Y10T 29/49707
See application file for complete search history.

(56) References Cited

U.S. PATENT DOCUMENTS 3,099,879 A   8/1963   Horovitz
3,163,475 A * 12/1964   Litsky .......................... 384/206
(Continued)

FOREIGN PATENT DOCUMENTS

CN   101450596 A   6/2009
CN   201494270 U   6/2010
(Continued)

OTHER PUBLICATIONS

German Search Report Corresponding to DE 10 2010 041 306.2.
(Continued)

*Primary Examiner* — Christopher Besler
(74) *Attorney, Agent, or Firm* — Davis & Bujold, P.L.L.C.; Michael J. Bujold

(57) ABSTRACT

A method of producing a spherical joint (1) with a spherical sleeve (3) having a spherical bearing area (16) and provided with a through-going assembly opening that extends, in an axial direction (4), which by virtue of the bearing area (16) is mounted and able to move by sliding in a spherical shell (2). The spherical sleeve (3) is arranged in an outer sleeve (7) in such a manner that the spherical sleeve (3) extends outwardly, in an axial direction (4), from both sides of the outer sleeve (7). A material, which hardens, is injected into an intermediate space (17), located between the spherical shell (2) and the outer sleeve (7), such that when the material hardens, the assembly of the spherical sleeve (3) and the spherical shell (2) is joined to the outer sleeve (7).

8 Claims, 1 Drawing Sheet

(56) References Cited

U.S. PATENT DOCUMENTS

| | | | |
|---|---|---|---|
| 3,629,921 A | 12/1971 | Davies et al. | |
| 4,055,369 A * | 10/1977 | Lynn et al. | 384/477 |
| 5,477,614 A | 12/1995 | Watanabe | |
| 7,325,289 B2 | 2/2008 | Budde et al. | |
| 8,282,305 B2 | 10/2012 | Rechtien et al. | |
| 2007/0019895 A1 | 1/2007 | Smith et al. | |
| 2007/0212165 A1* | 9/2007 | Rechtien et al. | 403/132 |
| 2009/0060633 A1 | 3/2009 | Broker et al. | |
| 2009/0304315 A1* | 12/2009 | Johnson | 384/295 |

FOREIGN PATENT DOCUMENTS

| | | |
|---|---|---|
| DE | 1 214 872 | 4/1966 |
| DE | 31 27 710 A1 | 1/1983 |
| DE | 3731586 A1 | 4/1989 |
| DE | 102 33 798 A1 | 2/2004 |
| DE | 10 2004 040 412 A1 | 3/2006 |
| DE | 10 2004 056 575 A1 | 6/2006 |
| DE | 10 2008 006 657 A1 | 8/2009 |
| GB | 2 103 532 A | 2/1983 |

OTHER PUBLICATIONS

International Search Report Corresponding to PCT/EP2011/064589.
Written Opinion Corresponding to PCT/EP2011/064589.
Chinese Office Action issued in corresponding Chinese Application No. 201180030366.8 mailed Aug. 5, 2014.

* cited by examiner

METHOD FOR PRODUCING A SPHERICAL SLEEVE JOINT

This application is a National Stage completion of PCT/EP2011/064589 filed Aug. 25, 2011, which claims priority from German patent application serial no. 10 2010 041 306.2 filed Sep. 24, 2010.

FIELD OF THE INVENTION

The invention concerns a method for producing a spherical sleeve joint, with a spherical sleeve having a spherical bearing area with a through-going assembly opening that extends in an axial direction, and which is fitted and able to move by sliding, by virtue of the bearing area, within a spherical shell, together with which it is arranged in an outer sleeve in such manner that the spherical sleeve extends in the axial direction on both sides out of the outer sleeve. Furthermore, the invention concerns a spherical sleeve joint of this type.

BACKGROUND OF THE INVENTION

The structure and assembly of sleeve joints are based on the production and joining of individual components (spherical sleeve, spherical shell, housing, sealing bellows, etc.) in individual processes and production steps. The overall function and characteristics of the sleeve joint are determined by the respective tolerance characteristics of the individual components and are optimized by follow-up processes (tempering, grinding etc) in order to meet customer requirements.

DE 10 2004 040 412 A1 discloses a spherical sleeve joint for chassis assemblies and steering assemblies of motor vehicles, which consists of a joint housing comprising two housing halves and a spherical sleeve provided with a rounded bearing surface, wherein the bearing surface is held in a bearing shell made of an elastic plastic material fixed in a recess of the joint housing. The two housing halves are pressed together in the direction of the central longitudinal axis with defined pressing forces during the assembly of the spherical sleeve joint and held, with the fitting length determined by the pressing forces, by means of at least one material-cohesive connection between the housing halves.

When a spherical sleeve joint of the type mentioned at the start is inserted into a holding receptacle, as a rule the diameter of the outer sleeve is reduced so the pressure exerted by the spherical shell on the bearing area is increased. This can result in an undesired increase of the friction between the spherical shell and the bearing area of the spherical sleeve.

SUMMARY OF THE INVENTION

Starting from there the purpose of the present invention is to avoid, or at least to minimize such an increase of the friction.

In the method according to the invention for producing a spherical sleeve joint, with a spherical sleeve having a spherical bearing area with a through-going assembly opening that extends in an axial direction, and which is fitted and able to move by sliding, by virtue of the bearing area, in a spherical shell, together with which it is arranged in an outer sleeve in such manner that the spherical sleeve extends in the axial direction on both sides outside the outer sleeve, a hardenable material is injected into a surrounding intermediate space between the bearing shell and the outer sleeve, by the hardening of which the assembly consisting of the spherical sleeve and the spherical shell is joined to the outer shell.

After it has hardened, the injected material forms a solid body by which the assembly formed by the spherical sleeve and the spherical shell is held fast in the outer sleeve. However, the body formed by the injected material shrinks during the hardening of the material so that a gap is formed in the radial direction between the body and the outer sleeve. The gap is relatively small, being for example of the order of a few hundredths of a millimeter wide. Yet, the gap makes room for the diameter of the outer sleeve to be reduced without increasing the pressure between the spherical shell and the bearing area. In the case when the diameter of the outer sleeve is reduced by more than the free space made available by the gap, then although the friction between the spherical shell and the bearing area is in fact increased, this happens to a lesser extent than when no gap was present to begin with.

Before the material is injected, the assembly formed of the spherical sleeve and the spherical shell is preferably arranged in the outer sleeve in such manner that the surrounding intermediate space between the spherical shell and the outer sleeve is an empty space. This empty space is then filled with the material by the injection process. The intermediate space in particular surrounds a central longitudinal axis of the spherical sleeve joint, which is preferably also the central longitudinal axis of the outer sleeve and/or of the spherical sleeve in the undeflected position and thus preferably extends in the axial direction.

In a further development of the invention the spherical sleeve joint with its outer sleeve is inserted into a holder by reducing the diameter of the outer sleeve. Preferably, the spherical sleeve joint with its outer sleeve is inserted, by reducing the diameter of the outer sleeve, into a recess of the holder, into which it is preferably pressed or pushed. In particular, by reducing the diameter of the outer sleeve the gap is closed. The spherical sleeve joint is preferably intended for use in a motor vehicle. Preferably, the holder is formed by a chassis component, such as a control arm or a wheel carrier mounted for example in the wheel suspension of a motor vehicle. The recess in the holder is preferably cylindrical.

To secure the assembly formed by the spherical sleeve and the spherical shell axially in the outer sleeve, preferably one or at least one axial end of the outer sleeve is at least partially deformed or bent radially inward. In particular, the material is injected around the end that has been deformed or bent radially inward. Preferably, the radially inwardly deformed or bent end extends at least in part as far, or almost as far as the spherical shell. According to a further development of the invention both axial ends of the outer sleeve are at least partially radially deformed or bent inward, and the material is preferably injected around them. In particular, the radially inwardly deformed or bent ends extend at least in part, as far or almost as far as the spherical shell.

The method for producing the spherical sleeve joint preferably comprises the following steps, in particular in the sequence indicated:

One axial end of the outer sleeve is at least partially deformed or bent radially inward.

The assembly formed by the spherical sleeve and the spherical shell is arranged in the outer sleeve, preferably in such manner that the spherical sleeve extends on both sides out of the outer sleeve.

The other axial end of the outer sleeve is at least partially deformed or bent radially inward.

During the injection of the material into the surrounding intermediate space, the material is injected around the axial ends of the outer sleeve.

In one embodiment of the invention, on both sides of and axially outside the outer sleeve, fixing rims with annular grooves for the attachment of sealing bellows are formed by injecting the material. Preferably, fixed on the annular grooves there are sealing bellows, which in each case extend as far as the spherical sleeve.

The spherical shell can be injected onto the bearing area. Preferably, however, the spherical shell is made as a separate component and in particular snapped onto the bearing area.

The outer sleeve and/or the spherical sleeve preferably each consist of metal, in particular steel. The spherical shell preferably consists of plastic, in particular polyoxymethylene (POM). The hardenable material consists for example of plastic or metal. In particular, the hardenable material consists of zinc, aluminum, magnesium or fiber-reinforced polyamide, for example PA66 GF30.

The outer sleeve is preferably of hollow cylindrical, or substantially hollow cylindrical form. The bearing area has a preferably spherical bearing surface which is in contact with a preferably hollow-sphere-shaped bearing surface of the spherical shell. The spherical sleeve comprises in particular two end areas, with the bearing area arranged between the end areas in the axial direction. Preferably, the end areas are of hollow cylindrical or substantially hollow cylindrical form.

The invention also concerns a spherical sleeve joint, in particular for a motor vehicle, with a spherical sleeve having a spherical bearing area and with a through-going assembly opening that extends in an axial direction, which by virtue of the bearing area is mounted to move by sliding in a spherical shell and, together with this, is arranged in an outer sleeve in such manner that the spherical sleeve extends in the axial direction on both sides out of the outer sleeve, such that by injecting a hardenable material into a surrounding intermediate space between the spherical shell and the outer sleeve a solid body is formed, by which the assembly consisting of the spherical sleeve and the spherical shell is fixed in the outer sleeve. The spherical sleeve joint according to the invention is preferably produced by the method according to the invention and can be developed further in accordance with any of the embodiments mentioned in this connection.

The body formed by the injected material shrinks during the hardening of the material, so that in the radial direction a gap is formed between the body and the spherical shell. This gap is relatively small, for example of the order of a few hundredths of a millimeter wide.

The outer sleeve can be or is inserted in a holder, preferably with a reduction of its diameter. In particular, with a reduction of its diameter and a consequent closing of the gap the outer sleeve can be or is inserted into a recess of the holder, preferably by being pressed or pushed in. The holder is preferably formed by a control arm or a wheel carrier, which is preferably mounted or can be mounted for example in the wheel suspension.

In an embodiment of the invention, one or at least one axial end of the outer sleeve is at least in part deformed or bent radially inward and the material is preferably injected around it, so that the assembly consisting of the spherical sleeve and the spherical shell is secured axially within the outer sleeve, in particular with interposition of the solid body. Preferably both axial ends of the outer sleeve are at least in part deformed or bent radially inward, preferably with the material injected around them, so that the assembly comprising the spherical sleeve and the spherical shell is secured axially in the outer sleeve on both sides. The end or ends deformed or bent radially inward preferably extends or extend, at least in part, up to or almost up to the spherical shell.

In an embodiment of the invention the solid body, on both sides of and outside the outer shell, has fixing rims formed during the injection of the material, with annular grooves onto which sealing bellows can be or are fixed.

Preferably, the spherical shell is made as a separate component and in particular it can be snapped in place onto the bearing area.

The spherical sleeve joint according to the invention preferably comprises a smaller number of components. In particular, the spherical sleeve joint according to the invention can be produced with a smaller number of assembly processes. By virtue of the joining of the pre-assembled spherical sleeve with its spherical shell and the housing by means of the injection process (with plastic, zinc, aluminum, etc.), the sleeve joint is preferably completed as a joint cartridge. The term "housing" is in particular understood to mean the outer sleeve. Thereafter, the sleeve joint is finished off by fitting the sealing system comprising the sealing bellows. In particular, the housing is designed in such manner that:
  to enable pressing into the holder (for example a control arm) its outer diameter does not need any further finishing work, and
  the spherical shell is supported in the axial direction.

The holder of the sealing system is formed either by the housing, and/or it consists partially or entirely of the injected material, preferably in the form of the fixing rims.

In particular, the following advantages are obtained:
  no tempering is needed, since by virtue of the injection process the injected material (hardenable material) adapts to the actual dimensions;
  the shrinking process is used in order to reduce frictional torque fluctuations during the assembly of the sleeve joint, for example into a control arm (as a rule frictional torque fluctuations are a disadvantage in the case of injected spherical shells for standard spherical joints);
  fewer components;
  fewer assembly processes;
  good loosening torque to frictional torque ratio thanks to the use of known systems (POM spherical shell, grease) and optimized pre-stressing;
  higher load-bearing capacity in the axial direction compared with a sleeve joint of "tube design".

BRIEF DESCRIPTION OF THE DRAWINGS

Below, the invention is described with reference to a preferred embodiment and to the drawing, which shows.

DETAILED DESCRIPTION OF THE PREFERRED EMBODIMENTS

Figure 1:
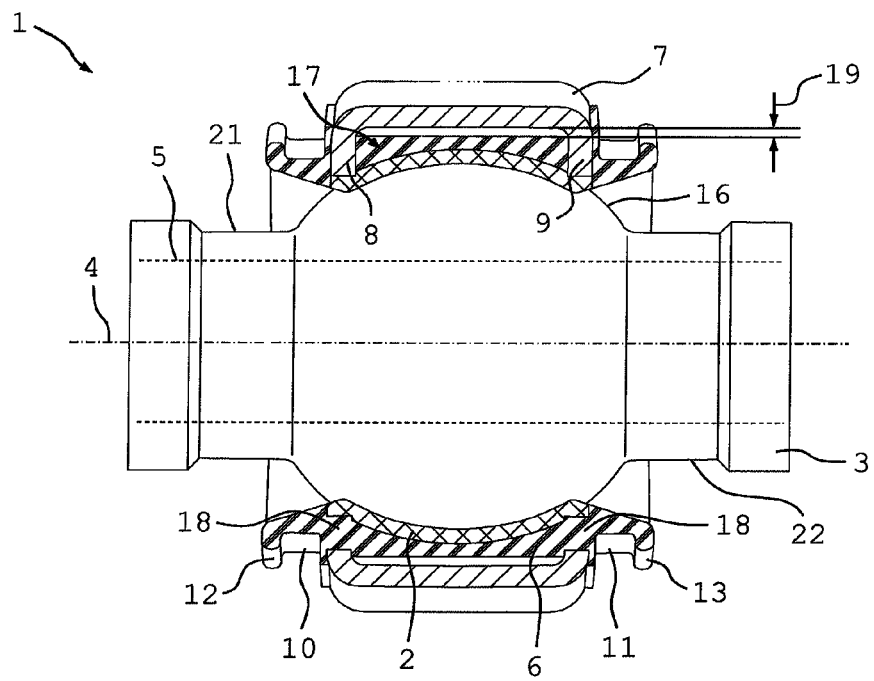
FIG. 1: A partially sectioned representation of a spherical sleeve joint according to the invention.

FIG. 1 shows a partially sectioned representation of a spherical sleeve joint 1 according to an embodiment of the invention, which comprises a spherical sleeve 3 fitted and able to move by sliding in a spherical shell 2 and which is provided with a through-going assembly opening 5 that extends in an axial direction 4. The spherical sleeve 3 fits into and can rotate and pivot in the spherical shell 2, which is fixed in an outer sleeve 7 by means of a solid body 6. Furthermore, the axial ends 8 and 9 of the outer sleeve 7 are bent radially inward and extend in part as far, or almost as far as the spherical shell 2. In addition the axial ends 8 and 9 engage in the solid body 6. Thus, the axial ends 8 and 9 form axial securing means for the body 6 and for the assembly consisting of the spherical sleeve 3 and the spherical shell 2 in the outer sleeve 7. Axially outside the outer sleeve 7, the solid body 6 has fixing rims 12 and 13 provided with annular grooves 10 and 11 which serve for the attachment of sealing bellows 14 and 15, as illustrated schematically in FIG. 2.

The spherical sleeve 3 has two end areas 21 and 22 and a spherical bearing area 16, onto which the spherical shell 2 is snapped and which is positioned between the end areas 21 and 22. In the assembled condition the sealing bellows 14 and 15 are fitted onto the essentially cylindrically shaped end areas 21 and 22 which extend axially outside the body 6.

The spherical joint 1 is made as follows:

The spherical shell 2 is snapped in place onto the spherical bearing area 16 of the spherical sleeve 3. Furthermore, the axial end 8 of the outer sleeve 7 is bent radially inward. Now, the assembly formed by the spherical sleeve 3 and the spherical shell 2 is positioned in the outer sleeve 7 in such manner that a surrounding, empty intermediate space 17 is enclosed between the spherical shell 2 and the outer sleeve 7. Then, the axial end 9 of the outer sleeve 7 is bent radially inward. The ends 8 and 9 extend as far, or almost as far as the spherical shell 2. Preferably, however, a small gap is left between the spherical shell and the ends 8 and 9. In at least one area (in this case two areas) an opening 18 is provided between the spherical shell 2 and the ends 8 and 9, through which the intermediate space 17 is accessible from the outside. Through the opening(s) 18 a plastic is injected into the intermediate space 17, this preferably being a glass fiber reinforced polyamide, in particular PA66 GF30. In addition, during the injection process the plastic is injected around the ends 8 and 9 in order to form the fixing rims 12 and 13. Once the plastic has hardened it forms the solid body 6, which in the radial direction has a gap 19 between it and the outer sleeve 7. The gap 19 is formed due to shrinkage of the injected plastic during its hardening. Preferably the gap 19 extends circumferentially.

Figure 2:
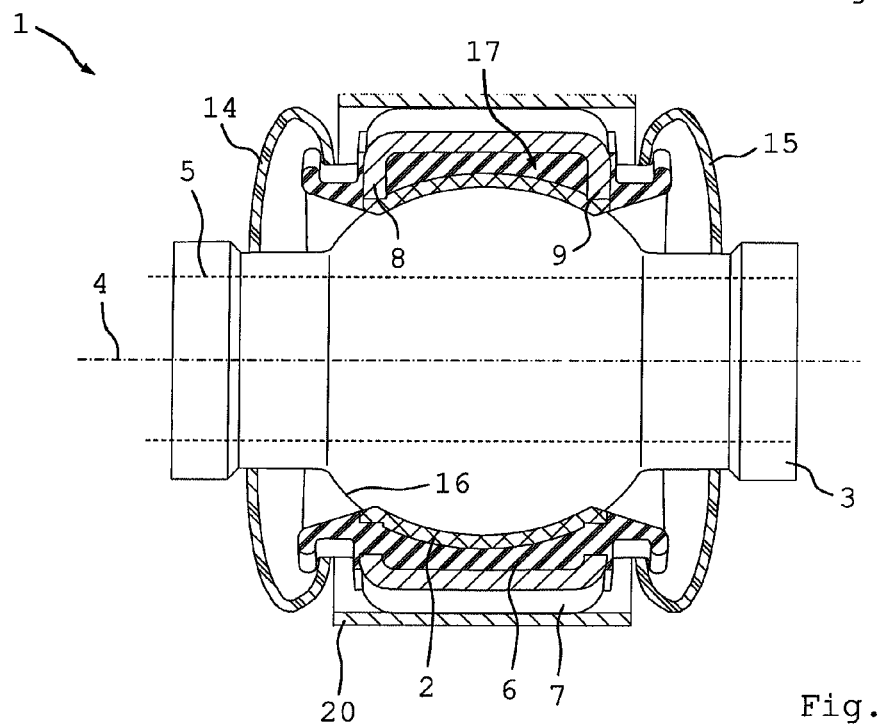
FIG. 2: A partially sectioned representation of the spherical sleeve joint in FIG. 1, shown in its condition when pressed into a holder.

As can be seen in FIG. 2, the spherical sleeve joint 1 is now pressed with its outer sleeve 7 into a holder 20 of a chassis control arm, so that the diameter of the outer sleeve 7 is reduced and the gap 19 is closed. Furthermore, as already mentioned above, the sealing bellows 14 and 15, which seal the spherical sleeve 3 relative to the solid body 6, are fitted.

INDEXES

1 Spherical sleeve joint
2 Spherical shell
3 Spherical sleeve
4 Axial direction
5 Through-going opening through the spherical sleeve
6 Solid body
7 Outer sleeve
8 Axial end of the outer sleeve
9 Axial end of the outer sleeve
10 Annular groove
11 Annular groove
12 Fixing rim
13 Fixing rim
14 Sealing bellows
15 Sealing bellows
16 Bearing area of the spherical sleeve
17 Intermediate space
18 Opening
19 Gap 20 Holder
21 End area of the spherical sleeve
22 End area of the spherical sleeve

The invention claimed is:

1. A method of producing a spherical joint (1) with a spherical sleeve (3) having a spherical bearing area (16) and provided with a through-going assembly opening that extends in an axial direction (4) which, by virtue of the bearing area (16), is mounted and able to move by sliding in a spherical shell (2) and, together with the spherical shell, is arranged in an outer sleeve (7) in such a manner that the spherical sleeve (3) extends, in an axial direction (4), out from opposite axial sides of the outer sleeve (7), the method comprising steps of:

mounting the spherical shell onto the spherical sleeve to form an assembly;

arranging the assembly into the outer sleeve such that an empty intermediate space is formed between the spherical shell and the outer sleeve;

injecting a liquid hardenable material into the empty intermediate space (17) located between the spherical shell (2) and the outer sleeve (7) to at least partially fill the empty intermediate space with the liquid hardenable material; and hardening the liquid hardenable material to form a solid body and join the assembly formed of the spherical sleeve (3) and the spherical shell (2) to the outer sleeve (7).

2. A The method according to claim 1, further comprising a step of inserting the spherical joint (1) comprising the assembly, the solid body and the outer sleeve into a holder thereby reducing a diameter of the outer sleeve (7).

3. The method according to claim 1, further comprising a step of deforming radially inward, at least one axial end (8) of the outer sleeve (7) and the injecting step comprising injecting the liquid hardenable material around the assembly comprising of the spherical sleeve (3) and the spherical shell (2) to at least partially fill the empty intermediate space with the liquid hardenable material and secure the assembly of the spherical sleeve (3) and the spherical shell (2) axially within the outer sleeve (7).

4. The method according to claim 1, further comprising a step of forming fixing rims (12, 13) with annular grooves (10, 11) from the liquid hardenable material that extend axially outward from the intermediate space, for attaching sealing bellows (14, 15), axially outside the outer sleeve (7), on the opposite axial sides of the outer sleeve (7).

5. The method according to claim 1, further comprising a step of forming the spherical shell as a component separate from the spherical sleeve, and snapping the spherical shell (2) onto the bearing area (16) of the spherical sleeve to form the assembly.

6. A method of producing a spherical joint which has a spherical sleeve with a spherical bearing area and a through-going assembly opening that extends along an axis, the method comprising the steps of:

sliding the bearing area of the spherical sleeve into a spherical shell;

positioning the spherical shell in an outer sleeve such that the spherical sleeve extends out of the outer sleeve from axially opposite ends of the outer sleeve along the axis;

bending the axially opposite ends of the outer sleeve radially inward toward the spherical shell to form an empty intermediate space between the spherical shell and the outer sleeve that circumferentially surrounds the spherical shell;

injecting a liquid hardenable material into the empty intermediate space located between the spherical shell and the outer sleeve to at least partially fill the empty intermediate space between the liquid hardenable material and the outer sleeve;

encasing the axially opposite ends of the outer sleeve in the liquid hardenable material;

solidifying the liquid hardenable material to form a solid body and join the spherical sleeve and the spherical shell to the outer sleeve; and injecting the liquid hardenable material in an amount such that an annular gap is formed between the liquid hardenable material and the outer sleeve as the liquid hardenable material solidifies and forms the solid body.

7. The method according to claim 1, further comprising a step of deforming radially inward, at least one axial end of the outer sleeve and the injecting step comprising injecting the liquid hardenable material into the empty intermediate space through an opening in the at least one axial end of the outer sleeve to at least partially fill the empty intermediate space with the liquid hardenable material.

8. The method according to claim 1, further comprising a step of bending opposite axial ends of the outer sleeve radially inward, prior to the step of injecting the liquid hardenable material, such that the opposite axial ends of the outer sleeve abut the spherical shell and axially define the empty intermediate space.

* * * * *